(12) United States Patent
Chuah et al.

(10) Patent No.: US 6,577,644 B1
(45) Date of Patent: Jun. 10, 2003

(54) QUALITY OF SERVICE (QOS) ENHANCEMENT TO MULTILINK POINT-TO-POINT PROTOCOL (PPP)

(75) Inventors: Mooi Choo Chuah, Eatontown, NJ (US); Enrique Hernandez-Valencia, Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/337,987

(22) Filed: Jun. 22, 1999

(51) Int. Cl.[7] ................................................. H04J 3/24
(52) U.S. Cl. ..................... 370/466; 370/235; 370/329
(58) Field of Search ............................... 370/235–238, 370/252, 466–468, 474, 401, 389, 329

(56) References Cited

U.S. PATENT DOCUMENTS

| | | | | |
|---|---|---|---|---|
| 5,557,798 A | * | 9/1996 | Skeen et al. ................... 705/35 |
| 5,717,689 A | * | 2/1998 | Ayanoglu .................... 370/349 |
| 5,757,783 A | * | 5/1998 | Eng et al. .................... 370/315 |
| 5,822,309 A | * | 10/1998 | Ayanoglu et al. ............ 370/315 |
| 6,049,549 A | * | 4/2000 | Ganz et al. .................. 370/449 |
| 6,222,820 B1 | * | 4/2001 | Hamami ...................... 370/218 |
| 6,223,222 B1 | * | 4/2001 | Fijolek et al. ............... 709/227 |
| 6,286,052 B1 | * | 9/2001 | McCloghrie et al. ........ 709/238 |
| 6,330,316 B1 | * | 12/2001 | Donak et al. ................ 379/196 |

* cited by examiner

Primary Examiner—Hassan Kizou
Assistant Examiner—Thai Hoang

(57) ABSTRACT

Multilink PPP is enhanced to provide for a more flexible quality of service (QoS) support in a wireless environment. In particular, multilink PPP is enhanced to enable a packet interface, or packet endpoint, to transmit a message to an opposite PPP peer, where the message identifies the number, and type, of classes on a particular PPP link. Two new messages are defined for use in the IP control protocol (IPCP) phase of a multilink PPP connection: a "non-Sharing QoS Negotiation" option message, and a "QoS-Enhanced Multilink Header Format" option message.

28 Claims, 4 Drawing Sheets

QUALITY OF SERVICE (QOS) ENHANCEMENT TO MULTILINK POINT-TO-POINT PROTOCOL (PPP)

CROSS-REFERENCE TO RELATED APPLICATIONS

Related subject matter is disclosed in the co-pending, commonly assigned, U.S. Patent application of Chuah, entitled "Providing Quality of Service in Layer Two Tunneling Protocol Networks," Ser. No. 09/259900, filed on Feb. 26, 1999.

BACKGROUND OF THE INVENTION (1) Field of the Invention

This invention relates generally to communications and, more particularly, to packet communications systems.

(2) Background Art

CDMA (carrier division multiple access) packet data service represents one method of providing wireless data services to mobile users over Internet Protocol (IP) based networks (e.g., see Tom Hiller, "Wireless IP Network Architecture based on IETF Protocols", TR45.6-3G/99.05.17.06). In TR 45.6, the point-to-point protocol (PPP) is used as the link layer between a mobile terminal, or mobile node (MN) and a Packet Data Serving Node (PDSN).

It has been proposed to enhance PPP to provide quality of service (QoS) features. One proposal is "real-time framing" (e.g., see C. Bormann, "PPP in a real-time oriented HDLC-like framing", work in progress, (draft-ietf-issll-isslow-rtf-05.txt), April 1999). Another approach is "multiclass multilink PPP" "(e.g., see C. Bormann, "The Multiclass Extension to Multilink PPP", work in progress, (draft-ietf-issll-isslow-mcml-06.txt), June 1999).

Unfortunately, both these modifications are not well-suited to wireless access networks. For example, real-time framing is not, sufficient because the PPP peers are only aware of any different classes of service when bearer traffic appears on the receiving interface. However, for a wireless access network this information is needed to decide which type of wireless link to activate—before bearer traffic appears. With respect to multiclass multilink PPP, this approach fragments each packet for transport across multiple links. In addition, multiclass multilink PPP, while specifying the maximum number of classes for a multilink PPP session, does not specify the class definitions.

SUMMARY OF THE INVENTION

Multilink PPP is enhanced to provide for a more flexible quality of service (QoS) support in a wireless environment. In particular, and in accordance with the invention, multilink PPP is enhanced to enable a packet interface, or packet endpoint, to transmit a message to an opposite PPP peer, where the message identifies the number, and type, of classes on a particular PPP link.

In an embodiment of the invention, multilink PPP is modified to support a "non-Sharing QoS Negotiation" option message, and a "QoS-Enhanced Multilink Header Format" option message during the IP control protocol (IPCP) phase.

DETAILED DESCRIPTION

Before describing the inventive concept, a brief overview of IP-based wireless data services is provided. The following description utilizes third generation (3G) wireless terminology for network entities (e.g., see Tom Hiller etc, "3G Wireless Data Provider Architecture Using Mobile IP and AAA", draft-hiller-3gwireless-00.txt, March, 1999).

Figure 1:
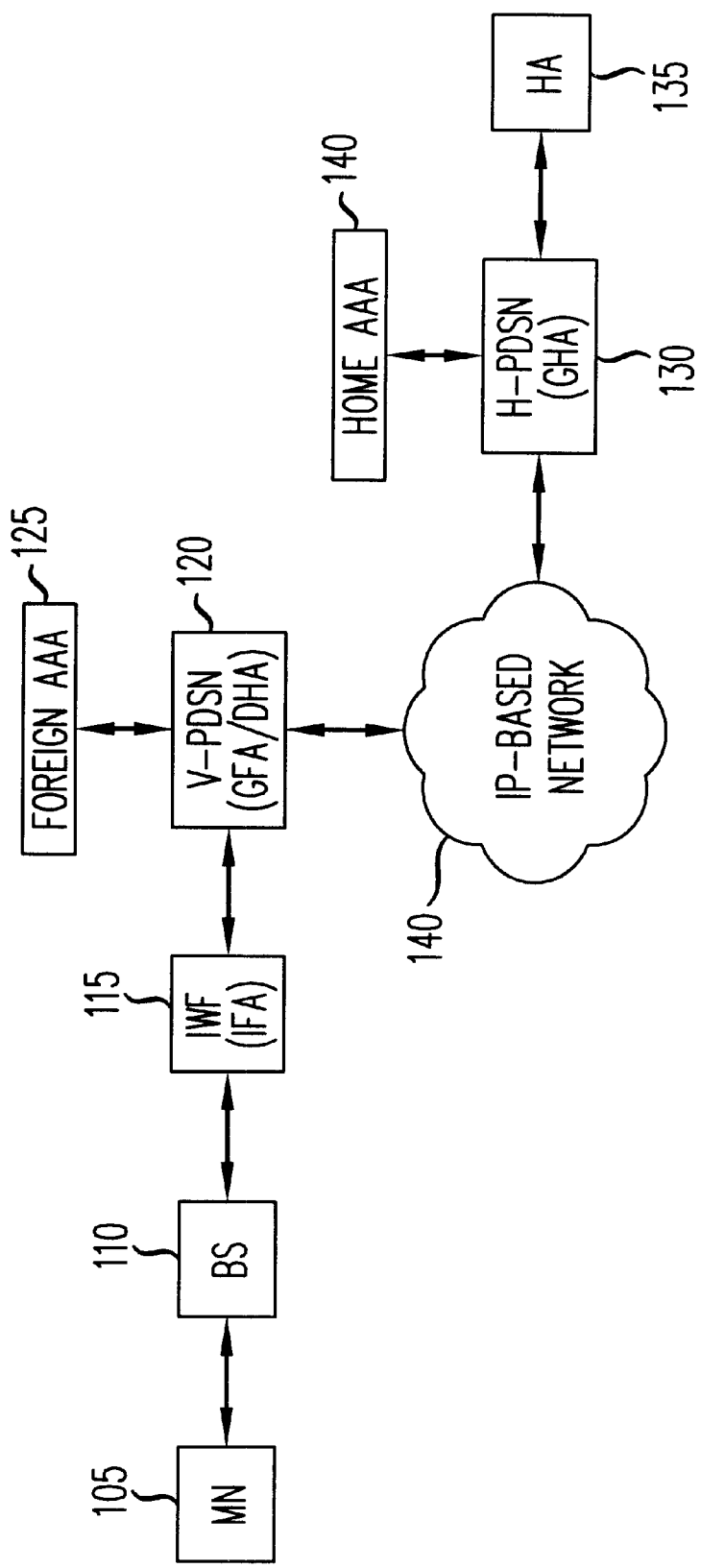
FIG. 1 shows an illustrative wide area wireless data network.

FIG. 1 shows a generic wide area wireless data network reference model. The elements are well-known and will not be described in detail. For example, the mobile endpoint or terminal equipment is represented by mobile node (MN) 105. The latter registers with the closest base station, e.g., BS 110, via link-layer messages. For the purposes of this example, it is assumed that the BS 110 is a part of a "foreign area" served by Interworking Function Unit (IWF) 115 (which is basically equivalent to an Intermediate Foreign Agent (IFA) as known in the art). IWA 115 is coupled to a Visiting Packet Data Serving Node (V-PDSN) 120 (which is basically equivalent to a gateway foreign agent/dynamic home agent (GFA/DHA) as known in the art). (It should be noted that, although not shown in FIG. 1, the foreign area comprises other IWFs, which can communicate with one another.) Similarly, the user (not shown) of MN 105 is associated with a "home area." The latter is represented by Home Packet Data Serving Node (H-DSN) 130 (which is basically equivalent to a gateway home agent) and home agent (HA) 135. It is assumed that well-known user authentication methods are used, e.g., via Authentication, Authorization, Accounting (AAA) Servers 125 and 140. In this context, BS 110, IWF 115, V-PDSN 120, H-PDSN 130 and HA 135 are all different forms of packet servers. Communications between, e.g., V-PDSN 120 and H-PDSN 130, is via Internet Protocol (IP)-based network 140.

As noted above, wireless data services are provided to the user associated with MN 105 via the IP-based network of FIG. 1. Since M 105 is visiting with a foreign area, support of such mobile-IP services typically requires that messages are "tunneled" from the home IP network to the foreign IP network for addressing and routing purposes. Within this context, it is assumed that communication between BS 110 and IWF 115 takes place at the link-layer.

Figure 2:
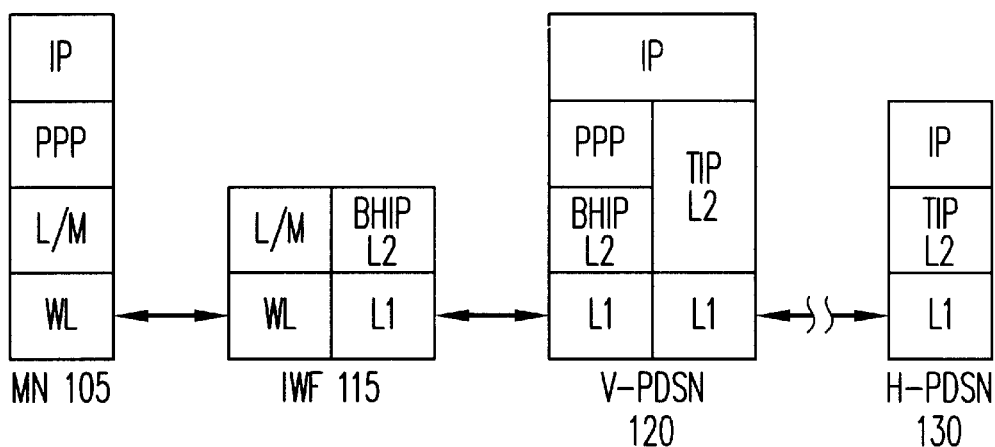
FIG. 2 shows illustrative protocol stacks for use in the network of FIG. 1 for providing IP services to mobile users.

An illustrative protocol stack using the proposed TR45.6 architecture for providing such IP services is shown in FIG. 2 (e.g., see Tom Hiller, "Wireless IP Network Architecture based on IETF Protocols", TR45.6-3G/99.05.17.06). In FIG. 2, IP represents the Internet Protocol layer, PPP represents the point-to-point protocol layer, L/M represents the logical link control/medium access control layer, WL represents the wireless link layer 1, and L1 represents any link layer 1 transport (the physical layer), BHIP L2 represents a back haul IP tunnel over link layer 2, and TIP L2 represents the core IP tunnel over link layer 2. As can be observed from FIG. 2, PPP is used as the link layer between the MN and the V-PDSN. The MN first registers with the closest BS via link-layer messages. Then, a PPP session is activated between the MN and the V-PDSN: Via the PPP session set up procedures, the V-PDSN can assign an IP address dynamically to the MN. In addition, some layer 3 tunnel set up messages are exchanged between the V-PDSN and the H-PDSN such that a core IP tunnel (TIP) exists from the H-PDSN to the V-PDSN. This core IP tunnel is used to deliver packets destined for the MN. Packets destined to the MN are intercepted by the H-PDSN and delivered to the V-PDSN via the core IP tunnel. The V-PDSN in turn delivers them to the appropriate IWF via the backhaul EP tunnel (this assumes that the network between the V-PDSN and IWF is an IP network). (Note that this backhaul IP tunnel carries PPP frames. Tunnel establishment protocols are known in the art (e.g., see P. Calhoun, G. Montenegro; C. Perkins, "Tunnel Establishment Protocol," draft-ietf-mobileip-calhoun-tep-01.txt, March 1998).) The IWF then delivers the packets to the appropriate base station, which delivers them to the MN. Packets from the MN are similarly delivered from the base station to the IWF, which delivers them to the V-PDSN. If necessary, a reverse core LP tunnel is set up from the V-PDSN to the H-PDSN for use in delivering traffic from the MN to any host within the home network. If no reverse tunnel exists, the packets are delivered to the H-PDSN via regular IP routing (only if packets are destined for a host within the H-PDSN). (Note that if the corresponding host does not reside in the H-PDSN, one can just use the V-PDSN as a dynamic home agent. In this mode, packets from any wired host to the MN are intercepted by the V-PDSN and routed to the MN. Similarly, any packets from the MN to any wired host are routed by the V-PDSN.)

The inventive concept modifies multilink PPP (e.g., see K. Slower etc, "The PPP Multilink Protocol (Mp)", RFC1990, August, 1996) and only that portion of multilink PPP relative to the inventive concept is described herein, i.e., the relevant portions of the IP control protocol (IPCP) phase. As such, familiarity with existing IP protocols is assumed. Further, it is presumed that a packet endpoint is suitably programmed to carry out the below-described methods using conventional programming techniques, which, as such, will not be described herein.

Figure 3:
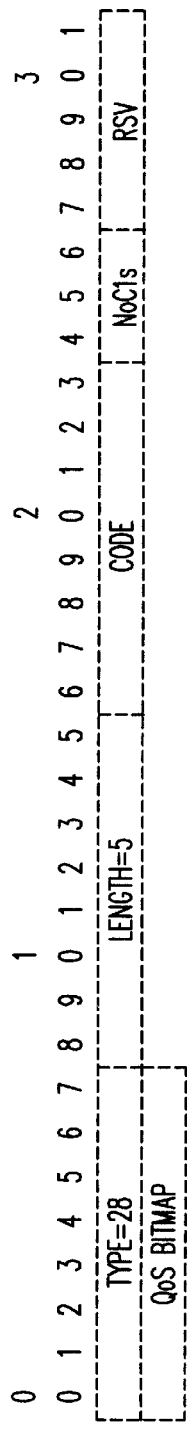
FIG. 3 shows an illustrative format for a new "Non-Sharing QoS" option in accordance with the principles of the invention.

An illustrative format for a new "Non-Sharing QoS" option message is shown in FIG. 3. The fields are transmitted from left to right. As shown in FIG. 3, in accordance with the invention, the Type field value of IPCP is set equal to 28—representing the Non-Sharing QoS option message—and the length field is set equal to 5 (the length of the Non-Sharing QoS" option message). Within IPCP, the following code values may be used:

Code=2: long sequence number packet format with classes; and

Code=6: short sequence number packet format with classes.

The NoCls field represents the number of classes on this particular link. Illustratively, eight classes are allowed. The QoS Bitmap field is a 1-byte bitmap (QoS bitmap) that is used to indicate the presence/absence of a particular class number. (It should be noted that since the QoS Bitmap field is 8 bits wide—it is assumed that 8 PPP QoS classes are sufficient (classes 0–7 with 0 as the highest priority class). Alternatively, the QoS Bitmap field could be expanded to support more than 8 classes.)

For example, in order for a PPP peer to communicate to another PPP peer that there will be 3 classes on this link, namely class 3, class 4, and class 5, then the NoCls field is set to a value of 3, and the QoS Bitmap field is set to "00011100" (where bit zero, or $b_0$, is the leftmost bit).

Finally, the Rsv field is reserved for future use.

Figure 4:
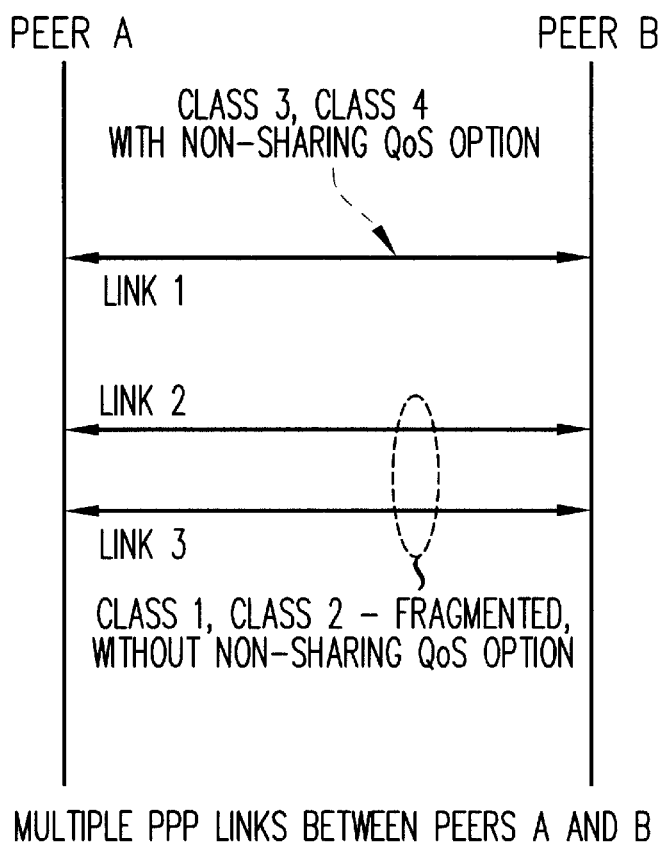
FIG. 4 shows an illustrative multilink PPP negotiation where one PPP link uses the Non-Sharing QoS option in accordance with the principles of the invention.

As a result of the above, during the IPCP negotiation phase (not shown), PPP peers can include the newly defined Non-sharing QoS option message together with MRRU and End Point Discriminator Options. FIG. 4 illustrates use of the Non-Sharing QOS Option with standard Multilink PPP. For convenience, in FIG. 4 it is assumed that the transmitting peer is Peer A and the receiving peer is Peer B (transmitting and receiving from the point of view of negotiation, e.g., Peer A requests the Non-Sharing QoS option.) As noted above, the Non-sharing QoS option message allows a PPP peer to specify the number of classes to be carried on a particular link. For example, assumed a PPP peer first activates a link (link 1) using this Non-Sharing QoS option message and specifies that there will be two classes on link 1, namely classes 3 and 4. (That is, the NoCls field is set to 2, and the QoS Bitmap field is set to "00011000.") Then, the PPP peer subsequently activates 2 more links without enabling the Non-sharing QoS option (i.e., no Non-Sharing QoS option message was included in the negotiation phase for these additional links). This means all PPP frames with class numbers 3 and 4 will be carried over link 1, the rest of the PPP frames will be segmented, or fragmented, (as is done in multilink PPP) and carried over the two remaining links (links 2 and 3) that were not negotiated with the Non-Sharing QoS option. Note that the bearer data (PPP frames) can use either the short or long sequence number fragment format with classes.

It should be noted that it is assumed that if the Non-Sharing QoS option is negotiated, then the option applies for the traffic in both directions between the PPP peers. Using the example above, PPP frames with class numbers 3 and 4 will be carried over link 1 in either direction (also represented in FIG. 4 by the double-headed arrows for link 1).

Figure 5:
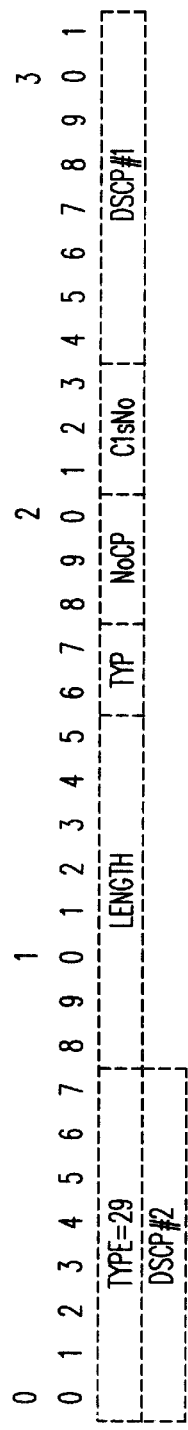
FIGS. 5, 6 and 7 show illustrative formats for a new "QoS-Enhanced Multilink Header Format" option in accordance with the principles of the invention.
Figure 6:
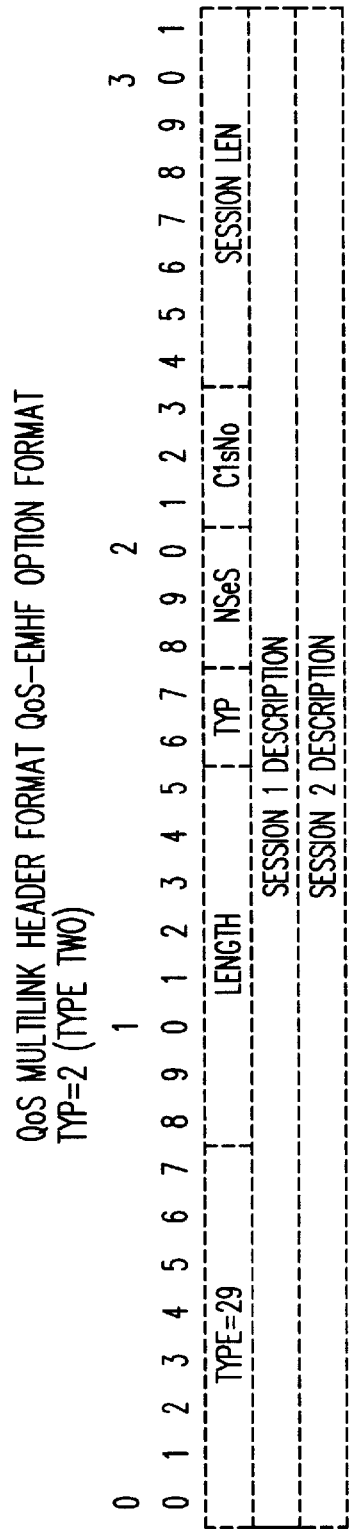

Turning now to FIGS. 5 and 6, and in accordance with the invention, illustrative formats for a new "QoS-Enhanced Multilink Header Format (QoS-EMHF)" option message are shown. The fields are transmitted from left to right. The QoS-EMHF option message supports the mapping of differentiated services (Layer 3) to PPP QoS classes.

As can be observed from FIGS. 5 and 6, the Type, field value of IPCP is set equal to 29—representing the QoS-EMHF option message, and the length field value is set equal to the length of this particular QoS-EMHF option message and the Typ field value distinguishes between one of two types of QoS-EMHF option messages. (It should be noted that the Typ field supports four different types of QoS-EMHF option messages, but only two are presently defined.)

A Typ field value of one is illustrated in FIG. 5. This type of QoS-EMHF option message comprises the following fields: NoCP, ClsNo, and a variable number differential service (DS) codepoint fields (DSCPs). The value of the NoCP field represents the number of DSCP codepoints that will be mapped to the class number specified by the value of the ClsNo field. (For a definition of DSCPs, see Definition of the differentiated Services Field (DS Field) in the IPv4 and IPv6 Headers (RFC2474), December, 1998.)

A type 1 QoS-EMHF option message enables PPP peers to map differential service codepoints to PPP QoS classes. This enables a PPP peer to appropriately mark the respective PPP frames. For example, assume that two PPP peers carry IP packets with multiple DSCPs marked, namely DSCP Code 1, DSCP Code 2, DSCP Code 3 and DSCP Code 4. Assume that it is desired to map DSCP Code 1 and DSCP Code 2 to PPP QoS Class 1, and DSCP Code 3 and DSCP Code 4 to PPP QoS Class 2. In the illustrated QoS-EMHF option message of FIG. 5, the PPP peers inform one another of this mapping with respect to so DSCP Code 1 and DSCP Code 2, where ClsNo is equal to a value representative of class 1. A similar message (not shown) is also transmitted with respect to the assignment of DSCP Code 3 and DSCP Code 4 to Class 2 for another link. Without this option, both PPP peers may perform different mapping. Equipment from different vendors may not perform the same mapping and hence it is harder to provide QoS guarantees over a PPP/MP link.

It should be noted that when this option is negotiated between peers, the accepting peer must transmit all IP packets marked with the respective DSCP values as PPP frames with the class number specified by the value of the ClsNo field in the QoS-EMHF option message. (For example, in FIG. 5, the accepting peer must transmit all IP packets marked with DSCP Code 1 and DSCP Code 2 with a class number of 1.) If the receiving PPP peer cannot accept this mapping, the receiving PPP peer will Configure-Nak or Configure-Reject the option back to the transmitting PPP peer.

A Typ field value of two is illustrated in FIG. 6. This type 2 QoS-EMHF option message comprises the following fields: NSeS, ClsNo, Session Len, and a variable number Session Description fields. The value of the NSeS filed represents the number of sessions that will use this PPP class number, which is specified by the value of the ClsNo field. The value of the SessionLen field defines the length of a session description (4 bytes if it is IP destination, 5 bytes for IP destination+Protocol, 6 bytes for IP destination+Protocol+Port No, 7 bytes for IP destination+Protocol+Port No+DSCP codepoint.) (In the context of Protocol and Port No., these terms are known in the art. For example, the protocol byte (not shown) is a predefined value that represents either TCP (transaction control protocol) or UDP (User Datagram Protocol), similarly for Port No.) The illustrative QoS-EMHF option message of FIG. 6 represents an NSeS value of 2, a Session Len value of 4, and, consequently, two Session descriptions, each of length 4.

For a type, 2 QoS-EMHF option message, the description length of all sessions must be the same. When the QoS-EMHF type 2 option is negotiated, the accepting, or receiving peer, must carry all IP packets with the specific session descriptions as PPP frames with class number specified in ClsNo field. If the receiving PPP peer cannot accept this mapping, it will Configure-Nak or Configure-Reject the option under IPCP. (It should be noted that specific packet endpoint implementations provide sufficient buffer space to accommodate the different classes of service that they provide to each multilink PPP user.)

Figure 7:
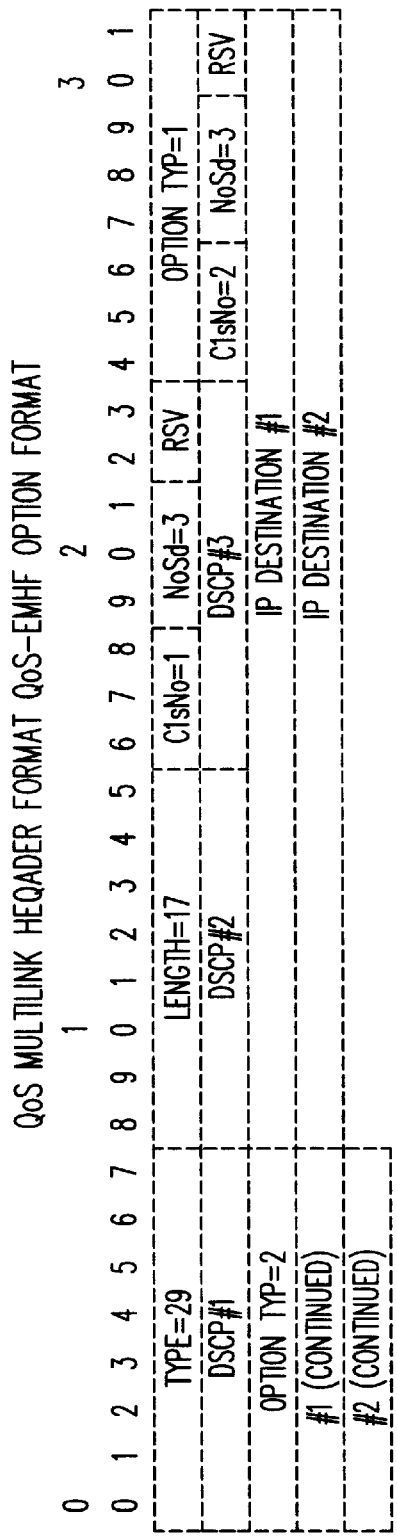

Alternatively, a QoS-EMHF option message may be formatted as shown in FIG. 7. This version of a QoS-EMHF option message combines QoS-EMHF type 1 and QoS-EMHF type 2 information. The field Clsno corresponds to the PPP class number, the field NoSD corresponds to the number of session descriptors associated with this PPP QoS class. The Option Typ fields have values of:

OptionTyp=1: Session Descriptor is DSCP codepoint (1 byte);
OptionTyp=2: Session Descriptor is IP Destination address (4 bytes);
OptionTyp=3: IP Destination Address+Port (5 byte);
OptionTyp=4: IP Destination Address+Port+Protocol ID (6 bytes); and
OptionTyp=5: IP Destination Address+Port+Protocol ID+DSCP Codepoint (7 bytes).

It should be noted that other Optiontyp information may also be added. In FIG. 7, PPP class 1 (ClsNo=1) has a session descriptor being the DSCP code point (OptionType=1) and maps 3 DSCP code points (DSCP #1, DSCP #2, and DSCP #3) to this PPP Class Number. In addition, there is also a PPP Class 2 (ClsNo=2) with a session descriptor being the IP Destination address and maps packets for 2 IP destination addresses to this PPP Class Number.

As a result of the above, the inventive concept provides a QoS mechanism within existing PPP that allows packets from some given sessions to be sent to one physical link and packets from other sessions to be sent to another physical link. Further, it provides the exact class numbers that are activated at any particular time for admission control, radio resource management, and traffic engineering purposes. Finally, it provides the ability to map packets from one or multiple fP sessions into one of the wireless link in the link bundle. In other words, a packet endpoint knows the exact types of the different classes that will be activated over any specific link.

Figure 8:
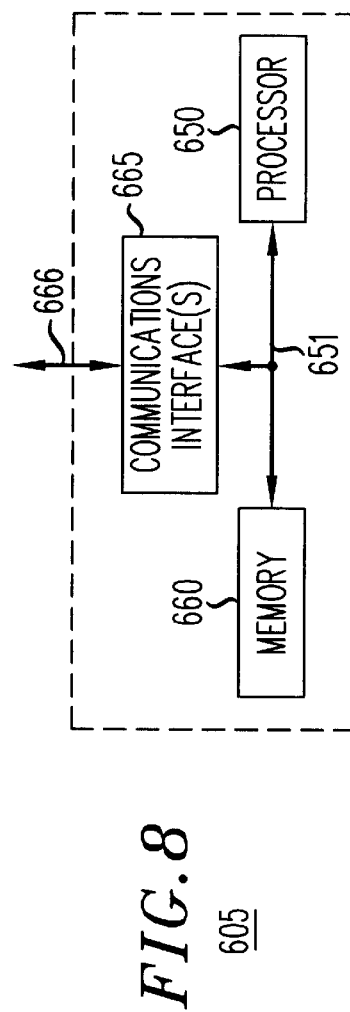
FIG. 8 shows an illustrative high-level block diagram of a packet endpoint for use in performing multilink PPP negotiation in accordance with the principles of the invention.

Turning briefly to FIG. 8, a high-level block diagram of a representative packet endpoint for use in performing multilink PPP negotiation in accordance with the principles of the invention is shown. Packet endpoint 605 is a stored-program-control based processor architecture and includes processor 650, memory 660 (for storing program instructions and data, e.g., for communicating in accordance with the above-mentioned modified multilink PPP negotiation, etc.) and communications interface(s) 665 for coupling to one or more packet communication facilities as represented by path 666.

The foregoing merely illustrates the principles of the invention and it will thus be appreciated that those skilled in the art will be able to devise numerous alternative arrangements which, although not explicitly described herein, embody the principles of the invention and are within its spirit and scope.

What is claimed is:

1. A method for use in a packet endpoint, the method comprising the steps of:
   negotiating a multilink point-to-point protocol (PPP) link with an opposite peer, wherein the negotiating step further comprises the step of:
      transmitting a message to the opposite peer, where the message includes an identification of a number of classes on a particular PPP link and each type of class on the particular PPP link, and
   wherein the message includes a field representing the number of classes on the particular PPP link.

2. The method of claim 1 wherein the message includes a field representing the type of each class on the particular PPP link.

3. The method of claim 2 wherein the type of each class field comprises a number of bits, the value of each bit position being representative of whether or not a particular class is on the particular PPP link.

4. The method of claim 1 wherein the message is a "Non-Sharing QoS" option message.

5. A method for use in a packet endpoint, the method comprising the steps of:
   negotiating a multilink point-to-point protocol (PPP) link with an opposite peer, wherein the negotiating step further comprises the step of:
      transmitting a message to the opposite peer, where the message includes an identification of a number of classes on a particular PPP link and each type of class on the particular PPP link, and wherein the negotiating step further includes the step of transmitting a second message to the opposite peer, where the second message comprises information that maps differential service codepoints to a particular PPP class.

6. The method of claim 5 wherein the second message comprises a class number field for identifying the particular PPP class, and at least one field the value of which represents the number of differential codepoint values mapped to the particular PPP class.

7. The method of claim 5 wherein the second message comprises a class number field for identifying the particular PPP class, a codepoints field for identifying the number of differential codepoint values mapped to the particular PPP class, and a number of fields equal to the value of the codepoints field, where each of the number of fields identifies a particular differential codepoint value.

8. The method of claim 5 wherein the message is a "QoS-Enhanced Multilink Header Format" option message.

9. A method for use in a packet endpoint, the method comprising the steps of:
negotiating a multilink point-to-point protocol (PPP) link with an opposite peer, wherein the negotiating step further comprises the step of:
transmitting a message to the opposite peer, where the message includes an identification of a number of classes on a particular PPP link and each type of class on the particular PPP link, and
wherein the negotiating step farther includes the step of transmitting a second message to the opposite peer, where the second message comprises information identifies the number of sessions that will use a particular PPP class.

10. The method of claim 9 wherein the second message comprises a class number field for identifying the particular PPP class, and at least one field the value of which represents the number of sessions using the particular PPP class.

11. The method of claim 9 wherein the second message comprises a class number field for identifying the particular PPP class, a number of sessions field, the value of which identifies the number of sessions using the particular PPP class, and a number of fields equal to the value of the number of sessions field, where each of the number of sessions fields provides a description of that session.

12. The method of claim 9 wherein the message is a "QoS-Enhanced Multilink Header Format" option message.

13. A method for use in a packet endpoint, the method comprising the steps of:
negotiating a multilink point-to-point protocol (PPP) link with an opposite peer, wherein the negotiating step further comprises the step of:
transmitting a message to the opposite peer, where the message comprises information that maps differential service codepoints to. a particular PPP class,
wherein the negotiating step further includes the step of transmitting a second message to the opposite peer, where the second message includes an identification of a number of classes on a particular PPP link and each type of class on the particular PPP link.

14. The method of claim 13 wherein the second message includes a field representing the number of classes on the particular PPP link.

15. The method of claim 13 wherein the second message includes a field representing the type of each class on the particular PPP link.

16. The method of claim 15 wherein the type of each class field comprises a number of bits, the value of each bit position being representative of whether or not a particular class is on the particular PPP link.

17. The method of claim 13 wherein the second message is a "Non-Sharing QoS" option message.

18. The method of claim 13 wherein the message comprises a class number field for identifying the particular PPP class, and at least one field the value of which represents the number of differential codepoint values mapped to the particular PPP class.

19. A method for use in a packet endpoint, the method comprising the steps of:
negotiating a multilink point-to-point protocol (PPP) link with an opposite peer, wherein the negotiating step further comprises the step of:
transmitting a message to the opposite peer, where the message comprises information that maps differential service codepoints to a particular PPP class, and
wherein the negotiating step further includes the step of transmitting a second message to the opposite peer, where the second message comprises a class number field for identifying the particular PPP class, a codepoints field for identifying the number of differential codepoint values mapped to the particular PPP class, and a number of fields equal to the value of the codepoints field, where each of the number of fields identifies a particular differential codepoint value.

20. A method for use in a packet endpoint, the method comprising the steps of:
negotiating a multilink point-to-point protocol (PPP) link with an opposite peer, wherein the negotiating step further comprises the step of:
transmitting a message to the opposite peer, where the message comprises information that maps differential service codepoints to a particular PPP class, and
wherein the message is a "QoS-Enhanced Multilink Header Format" option message.

21. A method for use in a packet endpoint, the method comprising the steps of:
negotiating a multilink point-to-point protocol (PPP) link with an opposite peer, wherein the negotiating step further comprises the step of:
transmitting a message to the opposite peer, where the message comprises information that identifies the number of sessions that will use a particular PPP class, and
wherein the negotiating step further includes the step of transmitting a second message to the opposite peer, where the second message includes an identification of a number of classes on a particular PPP link and each type of class on the particular PPP link.

22. The method of claim 21 wherein the second message includes a field representing the number of classes on the particular PPP link.

23. The method of claim 21 wherein the second message includes a field representing the type of each class on the particular PPP link.

24. The method of claim 23 wherein the type of each class field comprises a number of bits, the value of each bit position being representative of whether or not a particular class is on the particular PPP link.

25. The method of claim 21 wherein the second message is a "Non-Sharing QoS" option message.

26. A method for use in a packet endpoint, the method comprising the steps of:
negotiating a multilink point-to-point protocol (PPP) link with an opposite peer, wherein the negotiating step further comprises the step of:

transmitting a message to the opposite peer, where the message comprises information that identifies the number of sessions that will use a particular PPP class, and wherein the message comprises a class number field for identifying the particular PPP class, and at least one field the value of which represents the number of sessions using the particular PPP class.

27. A method for use in a packet endpoint, the method comprising the steps of:

negotiating a multilink point-to-point protocol (PPP) link with an opposite peer, wherein the negotiating step further comprises the step of:

transmitting a message to the opposite peer, where the message comprises information that identifies the number of sessions that will use a particular PPP class, and wherein the message comprises a class number field for identifying the particular PPP class, a number of sessions field, the value of which identifies the number of sessions using the particular PPP class, and a number of fields equal to the value of the number of sessions field, where each of the number of sessions fields provides a description of that session.

28. A method for use in a packet endpoint, the method comprising the steps of:

negotiating a multilink point-to-point protocol (PPP) link with an opposite peer, wherein the negotiating step further comprises the step of:

transmitting a message to the opposite peer, where the message comprises information that identifies the number of sessions that will use a particular PPP class, and wherein the message is a "QoS-Enhanced Multilink Header Format" option message.

\* \* \* \* \*